No. 883,056.　　　　　　　　　　　　　PATENTED MAR. 24, 1908.
R. L. SMITH.
FEEDING DEVICE FOR DRAFT ANIMALS.
APPLICATION FILED JULY 16, 1907.
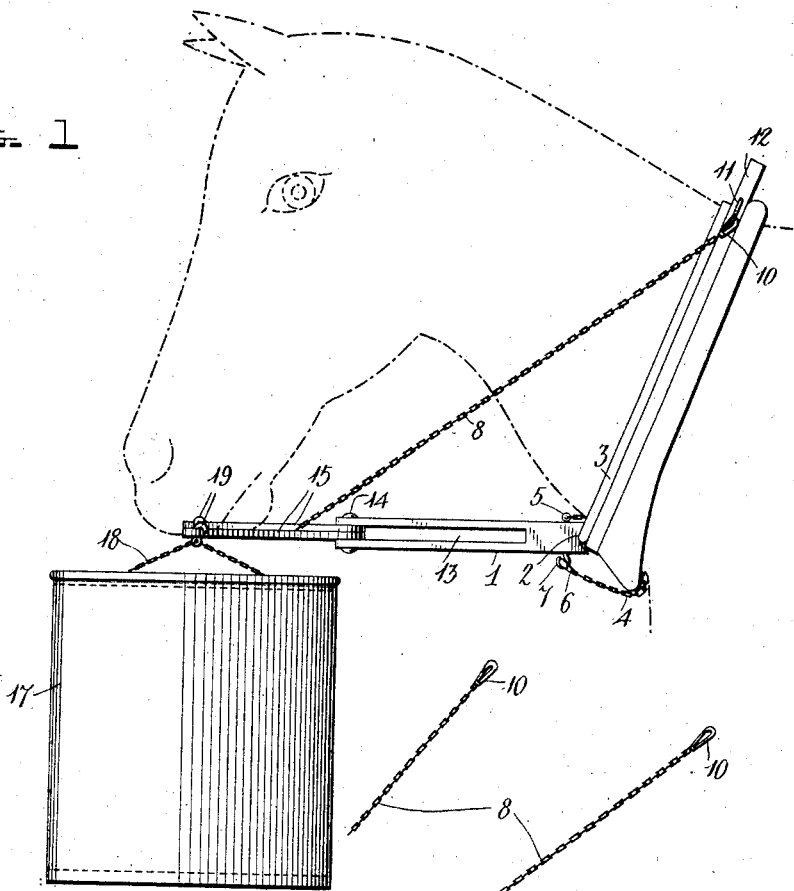
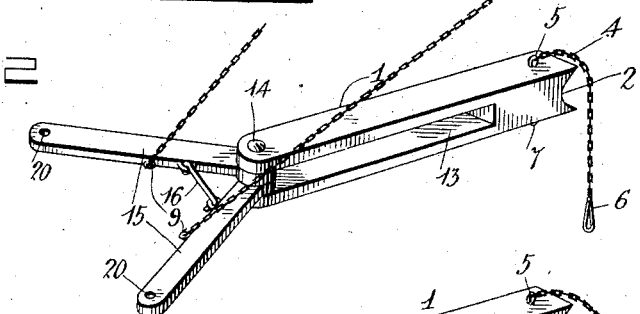
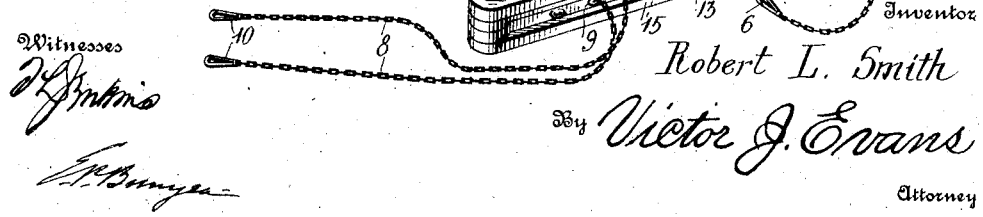
Witnesses
Inventor
Robert L. Smith
By Victor J. Evans
Attorney

UNITED STATES PATENT OFFICE.

ROBERT L. SMITH, OF LYNCHBURG, VIRGINIA.

FEEDING DEVICE FOR DRAFT-ANIMALS.

No. 883,056.  Specification of Letters Patent.  Patented March 24, 1908.

Application filed July 16, 1907. Serial No. 384,025.

*To all whom it may concern:*

Be it known that I, ROBERT L. SMITH, a citizen of the United States, residing at Lynchburg, in the county of Campbell and State of Virginia, have invented new and useful Improvements in Feeding Devices for Draft-Animals, of which the following is a specification.

This invention relates to feeding devices for draft animals, and one of the principal objects of the same is to provide a supporting device for a feed receptacle, said supporting device comprising hinged members which will permit the device to be folded within a small compass when not in use.

Another object of my invention is to provide simple and reliable means for supporting a feed receptacle in position to permit the animal to readily gain access to the interior of the receptacle and to prevent the spilling of the contents of said receptacle.

These and other objects may be attained by means of the construction illustrated in the accompanying drawing, in which:

Figure 1 is a side elevation of a feeding device made in accordance with my invention, and supported in position for use. Fig. 2 is a perspective view of the supporting device detached and opened out in position for use. Fig. 3 is a similar view of the supporting device closed.

Referring to the drawing for a more particular description of my invention, the numeral 1 designates a supporting bar provided with a notch 2 in one end thereof which is adapted to fit the curved front portion of a horse collar, 3, and is provided with a chain or other suitable flexible connection 4 which is secured to an eye 5 and provided with a snap hook 6 at its free end, said chain being adapted to pass around the horse collar, as shown in Fig. 1, and the snap hook is adapted to engage a hook 7 on the lower side of the supporting bar 1. The bar 1 is provided with a slot 13, and pivoted upon a pin 14 in the outer end of the slot 13 is a pair of links or bars 15 provided with a suitable latch 16 for holding said links in position to diverge from the end of the bar 1. Suitable chains or other connections 8 are secured to the bars 15, as at 9, and at the free ends of said chains snap hooks 10 are provided, said snap hooks being adapted to engage the terret rings 11 of the hames 12. A suitable feed receptacle 17 provided at the opposite sides thereof with chains 18 is supported upon the links 15 by means of hooks 19 which engage openings 20 in the ends of said links. Thus the receptacle 17 is supported upon opposite sides and held in position to prevent spilling the contents thereof and to permit the animal to gain access to the feed. Whenever it is desired to detach the device from the animal, the chains 18 are unhooked from the links 15, the latch 16 is released, the snap hooks 10 disengaged from the rings 11, and the links 15 are swung into the slots 13 of the bar 1. The chain 4 is then detached from the hook 7. In this condition the device can be placed in the vehicle to occupy but little space.

From the foregoing it will be obvious that my feeding device is of simple construction; will support the feed receptacle in position for use without liability of spilling its contents, and can be packed in small compass when not required for use.

Having thus described the invention, what I claim is:

1. A feeding device for animals comprising a slotted supporting bar having a notch at one end adapted to fit against the horse collar, a chain for securing said bar to the horse collar, chains for supporting the bar, said chains being adapted for connection to the terrets of the hame, a latch, links pivoted in a slot in said bar, and adapted to be folded therein and to be held in extended position by a latch, and a feed receptacle having chains secured to the opposite sides thereof and provided with hooks to engage said links.

2. A feeding device for animals comprising a supporting bar having a slot therein, links pivoted in said slot, a latch for holding said links in extended position, and a feed receptacle supported upon said links.

3. A feeding device comprising a supporting bar having a slot therein, links pivoted in said slot, means for holding said links in operative position, chains secured to said bar for supporting the same upon an animal, and a feed receptacle provided with chains and hooks to engage said links.

In testimony whereof, I affix my signature in presence of two witnesses.

ROBERT L. SMITH.

Witnesses:
LLOYD R. CRAIGHILL,
A. W. MOSBY.